US010289972B1

(12) United States Patent
Goyal et al.

(10) Patent No.: US 10,289,972 B1
(45) Date of Patent: May 14, 2019

(54) SYSTEM AND METHOD FOR REAL-TIME MULTI-FACET INTERACTIVE PLANNING

(71) Applicant: JDA Software Group Inc., Scottsdale, AZ (US)

(72) Inventors: Nitin Goyal, Irving, TX (US); Rubesh Mehta, Irving, TX (US); Backiaraj Irudayaraj, The Colony, TX (US); Frederick Lister, Keller, TX (US); Pravin Rangachari, Irving, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 0 days.

(21) Appl. No.: 13/972,560

(22) Filed: Aug. 21, 2013

Related U.S. Application Data

(60) Provisional application No. 61/693,779, filed on Aug. 28, 2012.

(51) Int. Cl.
G06Q 10/06 (2012.01)
G06Q 10/08 (2012.01)

(52) U.S. Cl.
CPC ....... G06Q 10/06313 (2013.01); G06Q 10/06 (2013.01); G06Q 10/0631 (2013.01); G06Q 10/08 (2013.01)

(58) Field of Classification Search
CPC ..... G06Q 10/06; G06Q 10/08; G06Q 10/0631
USPC ...................................................... 705/7.23
See application file for complete search history.

(56) References Cited

U.S. PATENT DOCUMENTS

| 4,409,750 | A | * | 10/1983 | Silbermintz | A63F 9/0842 273/153 S |
| 6,049,742 | A | * | 4/2000 | Milne | G06Q 10/06 700/99 |
| 2002/0032492 | A1 | * | 3/2002 | Sohner | G06Q 10/06 700/95 |
| 2002/0091707 | A1 | * | 7/2002 | Keller | G06F 16/30 |
| 2003/0050817 | A1 | * | 3/2003 | Cargille | G06Q 10/06 705/7.22 |
| 2006/0074741 | A1 | * | 4/2006 | Orumchian | G06F 16/90335 707/713 |
| 2010/0121678 | A1 | * | 5/2010 | McCormick | G06Q 10/06 705/7.12 |
| 2011/0040697 | A1 | * | 2/2011 | Constantinou | G06Q 10/06 705/348 |
| 2011/0131173 | A1 | * | 6/2011 | Fernandez Ortega | G06F 16/283 707/602 |

OTHER PUBLICATIONS

Pourabbas et al. (The Composite OLAP-Object Data Model: Removing an Unnecessary Barrier Academic year 2004-2005).*

(Continued)

Primary Examiner — Johnna R Loftis
Assistant Examiner — Matthew D Henry
(74) Attorney, Agent, or Firm — Spencer Fane LLP; Steven J. Laureanti

(57) ABSTRACT

A system and method are disclosed for real-time multi-facet interactive planning. The system includes a database that stores data associated with one or more entities. The system further includes a computer having a memory and a processor coupled with the database and configured to receive a facet value modification and modify the facet value based on a new facet value. The computer is further configured to propagate the new facet value to modify another facet value.

20 Claims, 9 Drawing Sheets

(56) References Cited

OTHER PUBLICATIONS (OLAP and OLAP Server Definitions—cited from Wayback Machine Apr. 29, 1999—https://web.archive.org/web/19990429 011146/http://www.olapcouncil.org/research/glossaryly.htm—pp. 1-10).*

* cited by examiner

SYSTEM AND METHOD FOR REAL-TIME MULTI-FACET INTERACTIVE PLANNING

CROSS-REFERENCE TO RELATED APPLICATIONS

The present disclosure is related to that disclosed in the U.S. Provisional Application No. 61/693,779, filed Aug. 28, 2012, entitled "Load Anchored Edit with Real Time Response in a Supply Constrained Sales and Operation Planning Environment." U.S. Provisional Application No. 61/693,779 is assigned to the assignee of the present application. The subject matter disclosed in U.S. Provisional Application No. 61/693,779 is hereby incorporated by reference into the present disclosure as if fully set forth herein. The present invention hereby claims priority under 35 U.S.C. § 119(e) to U.S. Provisional Application No. 61/693,779.

TECHNICAL FIELD

The present disclosure relates generally to multi-facet interactive planning and specifically to propagating subcomponent or resource load changes to demand and revenue of a finished product at different levels of the hierarchy. Any changes to demand at different levels of hierarchy are also propagated to revenue and subcomponent or resource load.

BACKGROUND

Aggregate level sales and operations planning requires a consensus process to analyze the impact of various factors on finished products. For example, in processes where capacity is a limiting factor and load is generated based on the demand, the load's impact on demand and revenue is difficult to analyze. No easy reverse correlation exists from the load output to the demand input. Current sales and operations planning tools only allow editing of input parameters such as demand and capacity, but not an output parameter such as load. This inability to modify load for accurate demand and revenue impact analysis limits the sales and operation planning (S&OP) consensus process and is undesirable.

Presently, demand and capacity must be modified by trial-and-error because load is not directly editable within current sales and operations planning tools. In converting demand to load, many factors such as, manufacturing or distribution lead-time, subcomponent or resource unit-conversion and process yields are considered. Reverse conversion of load to demand at the aggregate product family level becomes increasingly challenging since these factors cannot be simply aggregated. This inability to determine how a change in load affects product demand and revenue limits the current S&OP process. The present disclosure addresses these, and other, limitations of current sales and operation planning tools.

SUMMARY

According to some embodiments a real-time multi-facet interactive planning system, comprises a database that stores facet data associated with one or more entities, and a computer having a memory and a processor coupled with the database and configured to receive a new facet value, and propagate the new facet value to modify another facet value. Particular implementations of a real-time multi-facet interactive planning system may include one or more of the following features and aspects. The computer is configured to modify a demand facet value based on a new load facet value. The computer is configured to anchor a load in a unified view comprising a product facet and a resource facet. The computer is configured to modify dependent demand based on a split percentage, wherein dependent demand equals a product of demand at a particular time and a percentage site split at the same time. The computer is configured to calculate dependent demand at a second load facet when a first load facet is locked and load value is modified at the second load facet. The computer is configured to calculate and apply a product lead time factor when modifying demand facet based on a modified load facet. A load facet comprises at least one of a manufacturer, a distribution center, a buyer, a supplier, carrier, a facility, a plant, a product component, a product subcomponent, a resource, labor, a raw material, and an assembly line.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
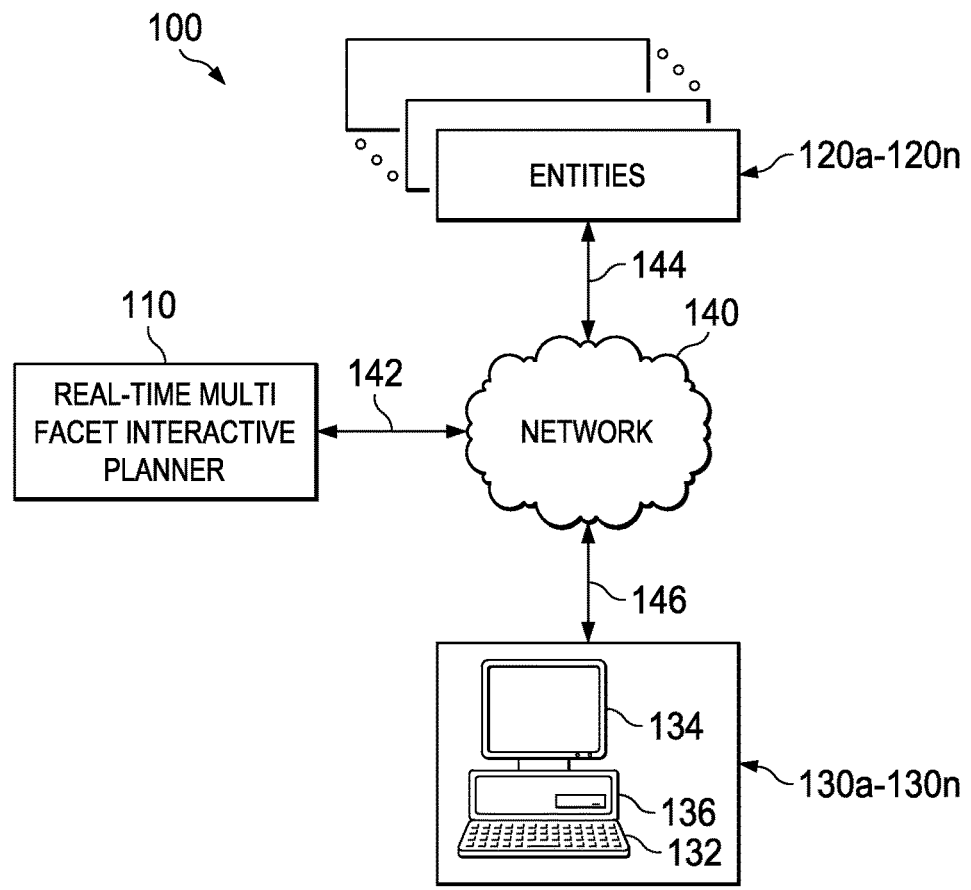
FIG. 1 illustrates an exemplary real-time multi-facet interactive planning system, according to a preferred embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates an exemplary system 100, according to a preferred embodiment. According to some embodiments, and as more fully described below, exemplary system 100 provides for, among other features, editing a load directly at aggregate product family levels, where load comprises, for example, the resource requirement of a product from manufacturers, distributions centers, buyers, suppliers, facilities, components, resources, raw materials, components, or assembly lines. Direct load editing propagates changes on product mix and revenue in real-time to finished goods. Exemplary system 100 enables a unified view with anchored data for both product and resource dimensions and displays simultaneous determinations of the impact of load changes on demand and revenue. Embodiments contemplate any number of nodes, levels of hierarchy, demand, dependent demand, facets, or nodes, according to particular needs and as illustrated by the following figures and examples.

Referring to FIG. 1, exemplary system 100 comprises real-time multi-facet interactive planner 110, one or more entities 120a-120n, one or more computer systems 130a-130n, a network 140, and communication links 142, 144, and 146. Although a single real-time multi-facet interactive planner 110, one or more entities 120a-120n, one or more computer systems 130a-130n, a network 140, and communication links 142, 144, and 146, are shown and described, embodiments contemplate any number of real-time multi-facet interactive planners 110, any number of entities 120a-120n, any number of computer systems 130a-130n, any number of networks 140, and any number of communication links 142, 144, and 146 according to particular needs.

In one embodiment, real-time multi-facet interactive planner 110 and one or more entities 120a-120n operate on one or more computer systems 130a-130n that are integral to or separate from the hardware and/or software that support exemplary system 100. One or more computer systems 130a-130n may include any suitable input device 132, such as a keypad, mouse, touch screen, microphone, or other device to input information. An output device 134 may convey information associated with the operation of exemplary system 100, including digital or analog data, visual information, or audio information. One or more computer systems 130a-130n may include fixed or removable non-transitory computer-readable storage media, such as magnetic computer disks, CD-ROM, or other suitable media to receive output from and provide input to exemplary system 100. One or more computer systems 130a-130n may include one or more processors 136 and associated memory to execute instructions and manipulate information according to the operation of exemplary system 100. One or more computer systems 130a-130n may include one or more databases comprising any data storage arrangements at one or more locations, local to, or remote from, real-time multi-facet interactive planner 110 and one or more entities 120a-120n. In one embodiment, real-time multi-facet interactive planner 110 and one or more entities 120a-120n store and retrieve data on the one or more databases, that may be used by exemplary system 100.

Although a single computer is shown in FIG. 1, real-time multi-facet interactive planner 110 and one or more entities 120a-120n may each operate on separate computers or may operate on one or more shared computers. Each of one or more computers 130a-130n may be a work station, personal computer (PC), network computer, notebook computer, tablet computer, personal digital assistant (PDA), cell phone, telephone, wireless data port, or any other suitable computing device. In an embodiment, one or more users may be associated with real-time multi-facet interactive planner 110. These one or more users may include, for example, a "planner" handling sales and operations planning, and/or one or more related tasks within exemplary system 100. In addition, or as an alternative, these one or more users within exemplary system 100 may include, for example, one or more computers programmed to autonomously handle sales and operations planning, and/or one or more related tasks within exemplary system 100.

In one embodiment, real-time multi-facet interactive planner 110 is coupled with network 140 using communications link 142, which may be any wireline, wireless, or other link suitable to support data communications between real-time multi-facet interactive planner 110 and network 140 during operation of exemplary system 100. One or more entities 120a-120n are coupled with network 140 using communications link 144, which may be any wireline, wireless, or other link or links suitable to support data communications between one or more entities 120a-120n and network 140 during operation of exemplary system 100. One or more computer systems 130a-130n are coupled with network 140 using communications link 146, which may be any wireline, wireless, or other link or links suitable to support data communications between one or more computer systems 130a-130n and network 140 during operation of exemplary system 100.

Although communication links 142, 144, and 146 are shown as generally coupling real-time multi-facet interactive planner 110, one or more entities 120a-120n, and one or more computer systems 130a-130n with network 140, real-time multi-facet interactive planner 110, one or more entities 120a-120n, and one or more computer systems 130a-130n may communicate directly with real-time multi-facet interactive planner 110, one or more entities 120a-120n, and one or more computer systems 130a-130n, according to particular needs.

In some embodiments, network 140 includes the Internet and any appropriate local area networks (LANs), metropolitan area networks (MANS), or wide area networks (WANs) coupling real-time multi-facet interactive planner 110, one or more entities 120a-120n, and one or more computer systems 130a-130n. For example, data may be maintained by real-time multi-facet interactive planner 110 at one or more locations external to real-time multi-facet interactive planner 110 and one or more entities 120a-120n and made available to one or more associated users of one or more entities 120a-120n using network 140 or in any other appropriate manner. Those skilled in the art will recognize that the complete structure and operation of communication network 140 and other components within exemplary system 100 are not depicted or described. Embodiments may be employed in conjunction with known communications networks and other components.

Figure 2:
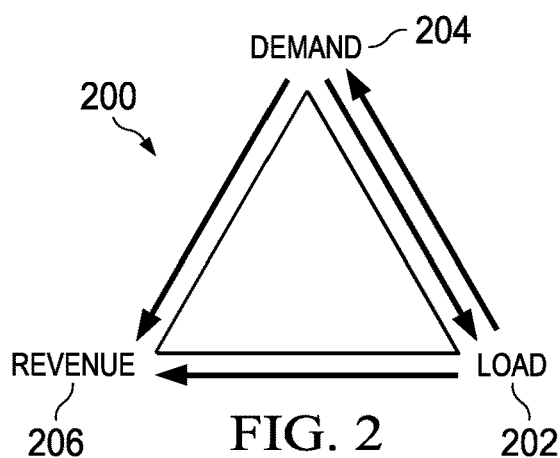
FIG. 2 illustrates facet interrelations, according to an embodiment.

FIG. 2 illustrates an interrelation 200 between three facets, load facet 202, demand facet 204, and revenue facet 206, according to an embodiment. In some embodiments, facets are capacity, price, inventory, or the like, according to particular needs. In some embodiments, changes to one facet value (i.e., load facet 202, demand facet 204, or revenue facet 206) propagate to another facet value by real-time multi-facet interactive planner 110. In an exemplary embodiment, real-time multi-facet interactive planner 110 determines new values for revenue facet 206 and demand facet 204 based on an inputted or changed load facet 202 value. In some embodiments, real-time multi-facet interactive planner 110 determines new values for load facet 202 and demand facet 204 based on an inputted or changed revenue facet 206 value. Real-time multi-facet interactive planner 110 may also determine new values for load facet 202 and revenue facet 206 based on an inputted or changed demand facet 204 value. In one embodiment, these facet modifications are made at the leaf or lowest level or aggregated levels. In other embodiments, these facet modifications are made at the product, customer, location and/or resource anchors or aggregate levels. Other determinations or calculations may be processed by real-time multi-facet interactive planner 110 in accordance with mathematical relationships between facets, according to particular needs.

Figure 3:
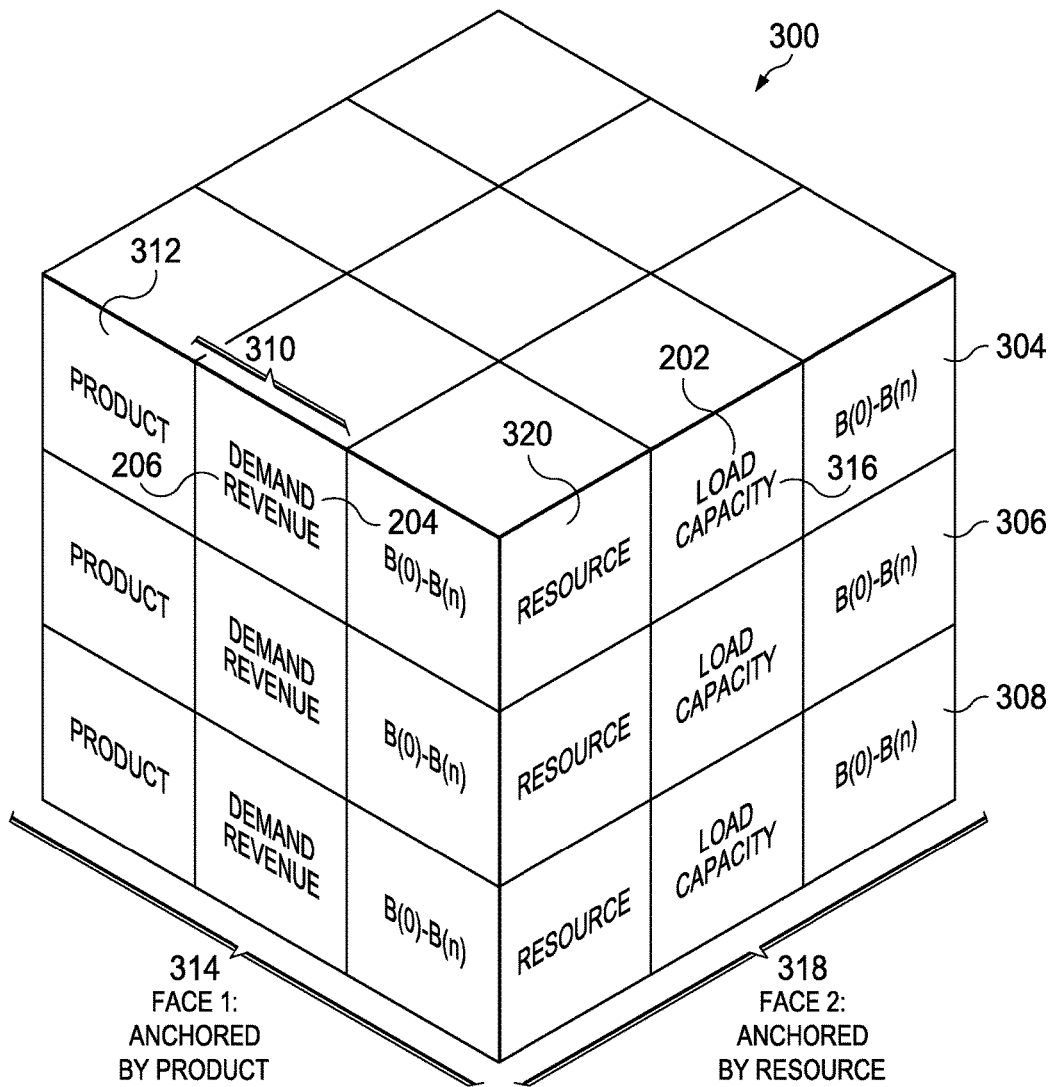
FIG. 3 illustrates a unified view of a facet interrelation data cube having independently rotatable rows, according to an embodiment.

FIG. 3 illustrates a unified view of facet interrelation data cube 300 having independently rotatable rows 304, 306, and 308, according to an embodiment. In some embodiments, facet interrelation data cube 300 may represent a user interface. According to some embodiments, facet interrelation data cube 300 creates a single unified view that permits a user to view the impact on demand while changing load in a sales and operations plan. For example, demand facet 204 and revenue facet 206 are represented on Face 1 314 of cube 300. Product 312 anchors demand facet 204 and revenue facet 206. Load facet 202 and capacity facet 316 are represented on Face 2 318 of cube 300. Resource 320 or "source" anchors load facet 202 and capacity facet 316. Rows 304, 306, and 308 rotate to illustrate propagated changes to facets based on a change in value of one or more other facets.

Figure 4:
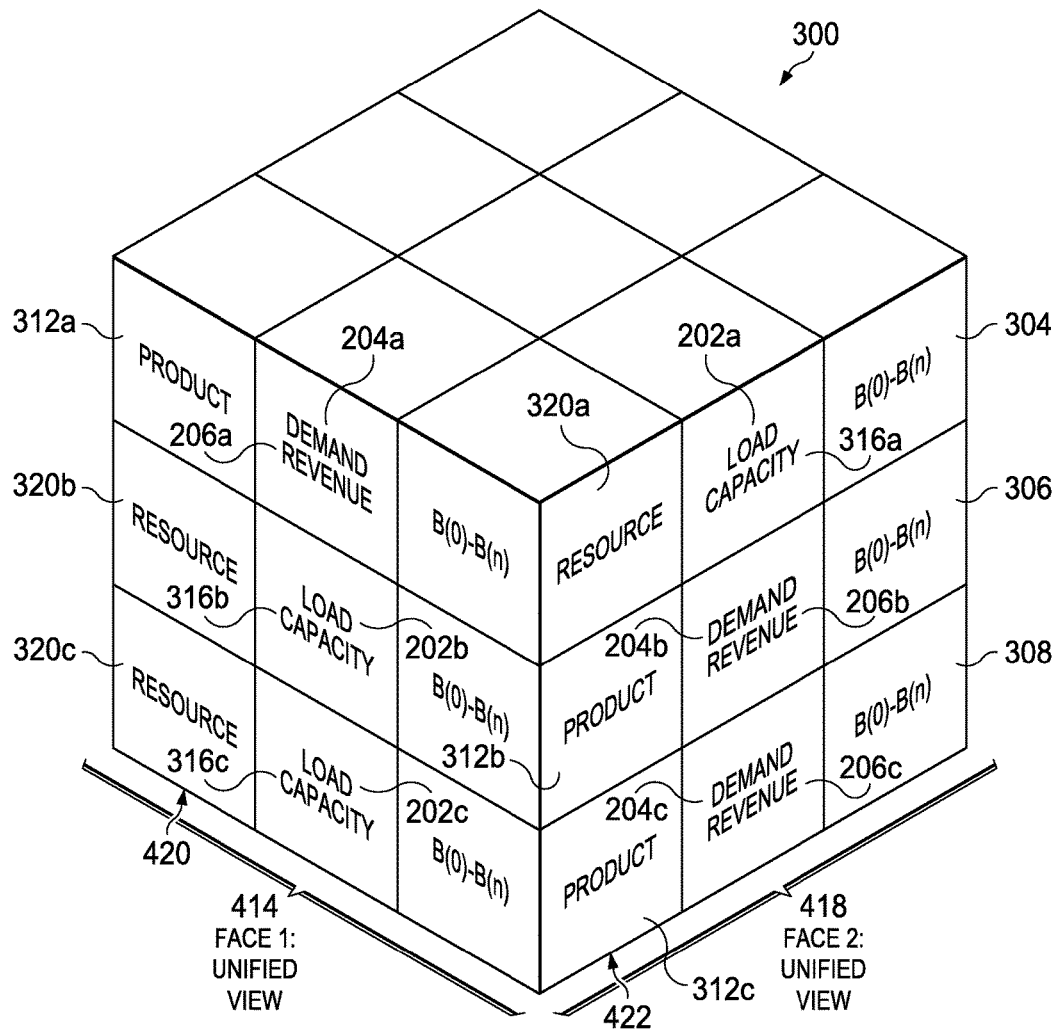
FIG. 4 illustrates a unified view of a facet interrelation data cube with rotated rows, according to an embodiment.

FIG. 4 illustrates a second unified view of facet interrelation data cube 300 with rows 306 and 308 rotated, according to an embodiment. Resources 320a, 320b, and 320c and product 312a, 312b, and 312c anchor the interactive rotation data. Two anchors (i.e., product 312a and resource 320b, 320c) are brought together in a single column 420 in unified view 414. Single column view 420 provides data on the impact on load 202b, 202c and revenue 206a when demand 204a is modified. In unified view 418, two anchors (i.e., resource 320a and product 312b, 312c) are brought together in a single column 422. Single column view 422 provides data on the impact on demand 204b, 204c and revenue 206b, 206c simultaneously while initially modifying load 202a and capacity 316a, 316c. Although particular facets are shown and described, embodiments contemplate any facet on any face of any cube.

Figure 5A:
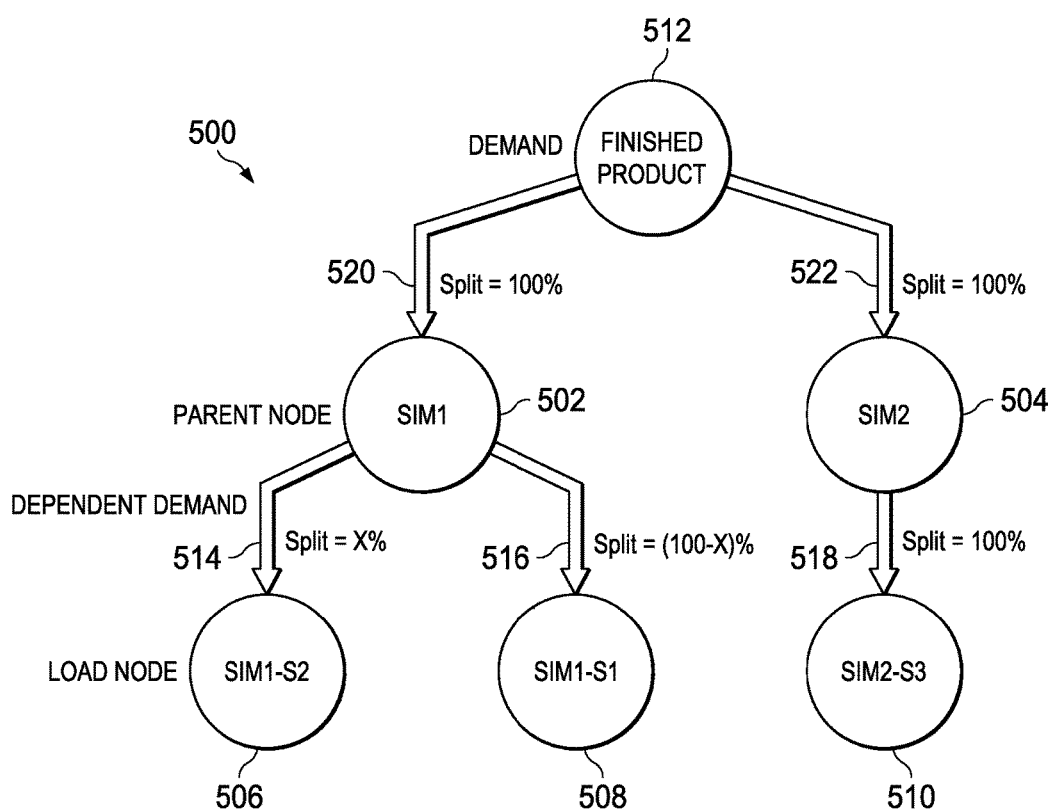
FIG. 5A illustrates an exemplary leaf level network of load nodes, according to an embodiment.

FIG. 5A illustrates a leaf level network 500 of nodes 502, 504, 506, 508, 510, and 512 according to an exemplary embodiment. Parent nodes 502 and 504 comprise simultaneous (SIM) parent nodes: SIM1 502 and SIM2 504. Dependent nodes 506, 508, and 510 comprise alternate dependent nodes representing various sites 1-3 (S1-S3): SIM1-S2 506, SIM1-S1 508, and SIM2-S3 510. In some embodiments, nodes 502, 504, 506, 508, 510, and 512 represent the resource, demand, or load of, for example, manufacturers, distributions centers, buyers, suppliers, facilities, components, resources, raw materials, components and assembly lines. In some embodiments, parent nodes SIM1 502 and SIM2 504 are simultaneous component nodes, that is, both components represented by the parent nodes SIM1 502 and SIM2 504 are needed in order to make a finished product 512. In some embodiments, parent nodes SIM1 502 and SIM2 504 provide for predefined split percentages 514, 516, 518 to source from dependent nodes SIM1-S2 506, SIM1-S1 508, and SIM2-S3 510. In some embodiments, parent nodes SIM1 502 and SIM2 504 provide for predefined split percentages 520, 522 to produce finished product 512. Although the nodes of FIG. 5 are shown and described as particular nodes configured in a particular manner, embodiments contemplate any number of nodes in any number of configurations, according to particular needs.

FIG. 5A further illustrates demand and load calculations according to an exemplary leaf level network. Demand and load are calculated at the lowest level of granularity and are stored in one or more databases of real-time multi-facet interactive planner 110 according to the following principles. Real-time multi-facet interactive planner 110 first calculates dependent demand at parent nodes SIM1 502 and SIM2 504 and reassigns load based on a percentage split. For example, to complete a finished product 512, the amount of subcomponents from parent nodes SIM1 502 and SIM2 504 are equal. Each node represents the same amount of subcomponents to complete a finished product 512, and the percentage split therefore is 100%. The percentage splits 514, 516, and 518 for each dependent node SIM1-S2 506, SIM1-S1 508, and SIM2-S1 510 are then used to assign the demand from parent nodes SIM1 502 and SIM2 504 to dependent nodes 506, 508, and 510. For example, a single option, SIM2-S3 510, exists for the production of subcomponent of parent node SIM2 504, and therefore the percentage split 518 of SIMS2-S3 is 100%. In contrast, two options exist for the production of the subcomponent of parent node SIM1 502: SIM1-S1 508 and SIM1-S2 506. The percentage resource production split for SIM1-S1 508 and SIM1-S2 506 therefore totals 100%, but the resource is allocated with x % resource production from SIM1-S2 506 and a 1-x % resource production from SIM1-S1 508. This split may represent, for example, alternate site sources for subcomponents of subcomponent SIM1. If a resource from SIM1-S2 506 is not available or decreases, a related increase is available from SIM1-S1 508. Finally, the dependent demand calculated for each dependent node SIM1-S2 506, SIM1-S1 508, and SIM2-S1 510 are used to calculate load at each dependent node. In this way load or demand may be propagated throughout a node network based on availability of resources from various sites. The following formulae and examples illustrate how demand and load are determined by a real-time multi-facet interactive planner 110 from an exemplary leaf level network, according to some embodiments.

Real-time multi-facet interactive planner 110 determines the dependent demand at a node as follows in equation 1, where t is time period, demand is the demand from the parent node, and site_split is the percentage split connecting the parent node with the dependent node:

$$\text{Dependent\_Demand}_{(t)} = \text{Demand}_{(t)} * \text{Site\_split}_{(t)} \quad (1)$$

For example, if the percentage split at dependent node SIM1-S2 506 is 40%, the demand from SIM1 is multiplied by 0.4 to determine the dependent demand at dependent node SIM1-S2.

Load at a resource is defined in the following equation 2, where t is time period, LT is the lead-time offset, Unit_Conversion is the time spent to produce one unit, and Yield is the efficiency of production:

$$\text{Load}_{(t-LT)} = \text{Dependent\_Demand}_{(t)} * \text{Unit\_Conversion}_{(t-LT)} / \text{Yield}_{(t-LT)} \quad (2)$$

As an example only and not by way of limitation, a dependent node may require 0.5 hours or 4 hours (Unit Conversion) to make one unit. If, for example, the Yield (efficiency) is 50%, real-time multi-facet interactive planner 110 divides the dependent demand multiplied by unit conversion by 0.5. To make 10 units at a dependent node, for example, the node resource works twice as hard because half of the work is being lost.

Moreover, real-time multi-facet interactive planner 110 calculates and applies a lead time offset factor for timely production. In one embodiment, lead time can include the time when the product is needed, the shipping time, or any time period where there is manufacturing time. If, for example, a two month lead time offset exists for a product and the product is needed by July, real-time multi-facet interactive planner 110 determines that production needs to start by April.

Figure 5B:
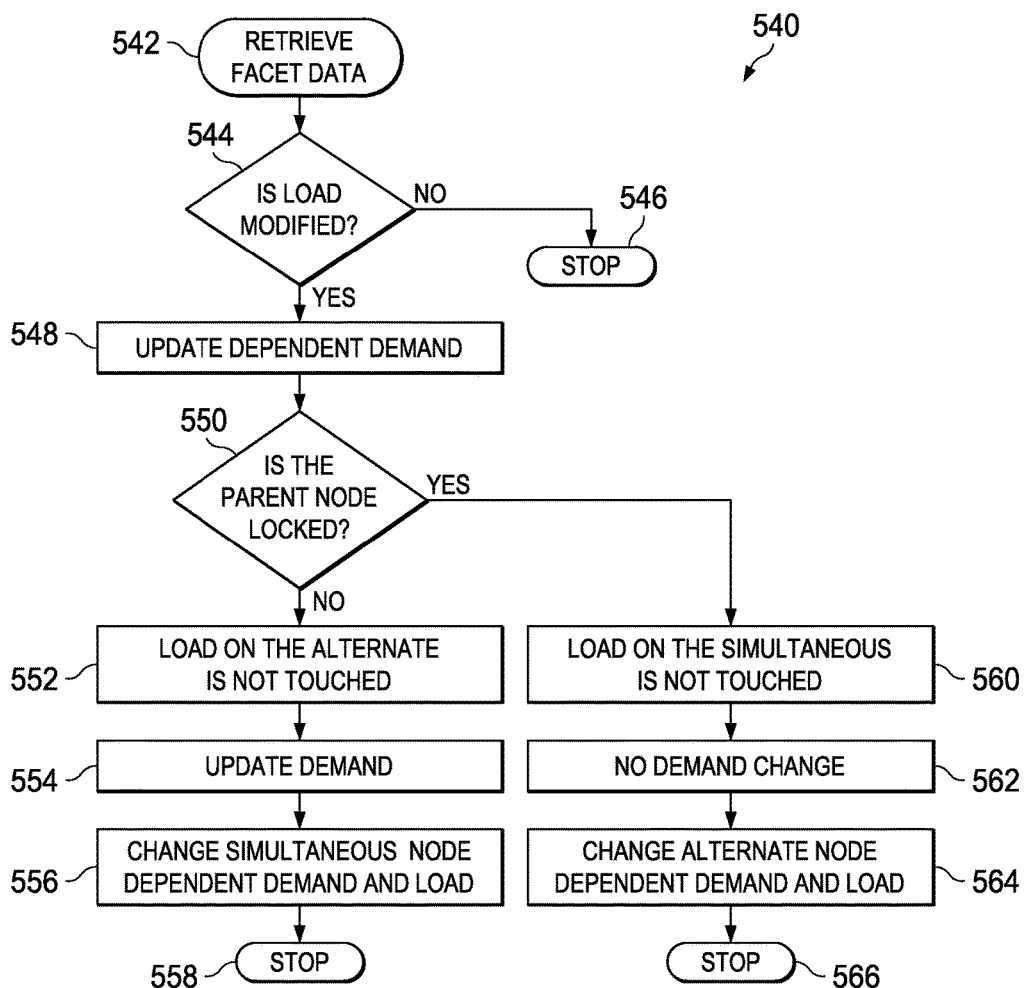
FIG. 5B illustrates an exemplary real-time multi-facet interactive planning method, according to embodiments.

According to some embodiments, when real-time multi-facet interactive planner 110 fetches data, load, dependent demand and demand are aggregated using real-time multi-facet interactive planning method 540 of FIG. 5B. In some embodiments, aggregated numbers are then used for real-time calculations without going to the lowest level data.

FIG. 5B illustrates an exemplary real-time multi-facet interactive planning method 540 for real-time aggregate level calculations, according to an embodiment. In some embodiments, when load is edited in real-time multi-facet interactive planner 110, real-time multi-facet interactive planning method is performed on aggregate level data according to the following steps. The method begins at step 542 where real-time multi-facet interactive planner 110 retrieves facet data for a particular sales and operation plan from one or more entities 120a-120n or the one or more databases. The facet data includes, for example, load, capacity, revenue and demand. At step 544, real-time multi-facet interactive planner 110 determines whether load is modified. If the load is modified, real-time multi-facet interactive planner 110 updates dependent demand at that node, at step 548. A new dependent demand may be calculated based on the change in load according to equation 3 where New_Dependent_Demand represents a demand calculated based on a change in load, Org_Dependent_Demand represents (original) demand before load is modified, New_Load is the modified load value, and Org_Load represents the unmodified load value:

$$\text{New\_Dependent\_Demand}_{(t+LT)} = \text{Org\_Dependent\_Demand}_{(t+LT)} * \text{New\_Load}_{(t)}/\text{Org\_Load}_{(t)} \qquad (3)$$

If load is not modified, the method ends at step 546.

At step 550, real-time multi-facet interactive planner 110 determines whether a parent node to the dependent node representing the modified load is locked at a specific level of demand. The parent node may be automatically unlocked if, for example, the dependent node representing the load change has no alternate nodes where load may be transferred. In contrast, a parent node may be locked based on a user input if, for example, demand is required to remain unchanged. If the parent node is locked then load may be transferred to an alternate dependent node. When a load transfers, the total demand remains constant, while another load resource receives a greater share of the load. If the parent node is not locked, load may be reduced or increased on the dependent node and on all nodes at a higher level in the hierarchy. When a load is increased or reduced, a percentage load split between a plurality of load resources is modified based on the increase or decrease.

If the parent node is not locked at 550, the real-time multi-facet interactive planner 110 does not modify load resources on an alternate node, at step 552. At step 554, the change in the dependent demand (new dependent demand–org dependent demand) is applied to the finished product demand based on equation 4:

$$\text{New\_Demand}_{(t+LT)} = \text{Old\_Demand}_{(t+LT)} + (\text{New\_Dependent\_Demand}_{(t+LT)} - \text{Org\_Dependent\_Demand}_{(t+LT)}) \qquad (4)$$

Using the connection matrix (network relationship between resources that are tied to the same product), the dependent demand and load on the simultaneous nodes are updated, at step 556 according to the following equations.

The dependent demand on the simultaneous nodes is updated by the finished goods demand factor (new demand/old demand) according to equation 5:

$$\text{New\_Dependent\_Demand}_{(t+LT)} = \text{Org\_Dependent\_Demand}_{(t+LT)} * \text{New\_Demand}_{(t+LT)}/\text{Org\_Demand}_{(t+LT)} \qquad (5)$$

The load with different lead time offset on the simultaneous nodes is updated by the dependent demand factor (new dependent demand/old dependent demand) as defined in equation 6:

$$\text{New\_Load}_{(t+LT-LT2)} = \text{Org\_Load}_{(t+LT-LT2)} * \text{New\_Dependent\_Demand}_{(t+LT)}/\text{Org\_Dependent\_Demand}_{(t+LT)} \qquad (6)$$

The dependent demand and load on the alternate nodes are not changed. The method ends at step 558.

If a parent node is locked at step 550, then the load is transferred from one alternate to another at step 560. The finished product demand and parent demand is not modified, at step 562. When a load is transferred, the real-time multi-facet interactive planner 110 picks an alternate node source or resource to transfer the load to and updates the dependent demand and load of the alternate node or nodes at step 564. If there is more than one target resource, the difference in dependent demand is applied to a target resource based on the dependent demand of the targets, as shown in equation 7:

$$\text{New\_Dependent\_Demand}_{(t+LT)} = \text{Org\_Dependent\_Demand}_{(t+LT)} + [\text{Org\_Dependent\_Demand}_{(t+LT)} - \text{New\_Dependent\_Demand}_{(t+LT)}]\text{source} \qquad (7)$$

The load (with different lead time offset) on the alternate nodes is then updated by the dependent demand factor (new dependent demand/old dependent demand), as shown in equation 8:

$$\text{New\_Load}_{(t+LT-LT2)} = \text{Org\_Load}_{(t+LT-LT2)} * \text{New\_Dependent\_Demand}_{(t+LT)}/\text{Org\_Dependent\_Demand}_{(t+LT)} \qquad (8)$$

In one embodiment, the edited load amounts at aggregate levels may be reconciled at the lowest level when the edits are propagated in real-time multi-facet interactive planner 110. In an embodiment, the edited load is first disaggregated. Real-time multi-facet interactive planner 110 initiates similar logic at the lowest load level to recalculate the load on connected resources and the finished goods demand. Real-time multi-facet interactive planner 110 updates site percentage splits for the node resources where dependent demand changes, as shown in equation 9:

$$\text{New\_Site\_Splits}_{(t+LT)} = \text{New\_Dependent\_Demand}_{(t+LT)}/\text{New\_Demand}_{(t+LT)} \qquad (9)$$

The method ends at step 566.

Figure 6:
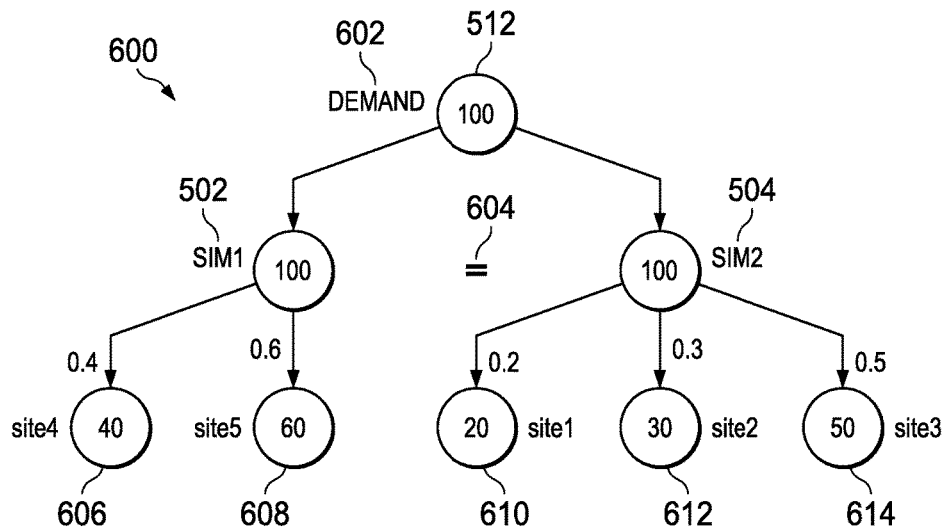
FIGS. 6-8 illustrate particular examples of an exemplary leaf level network of load nodes.
Figure 7:
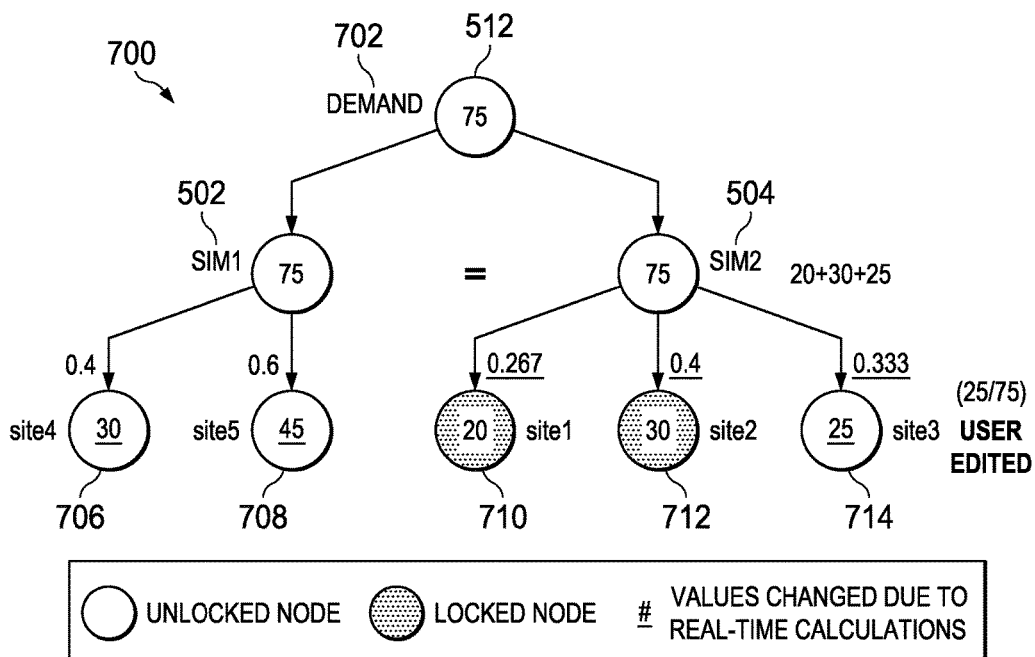
Figure 8:
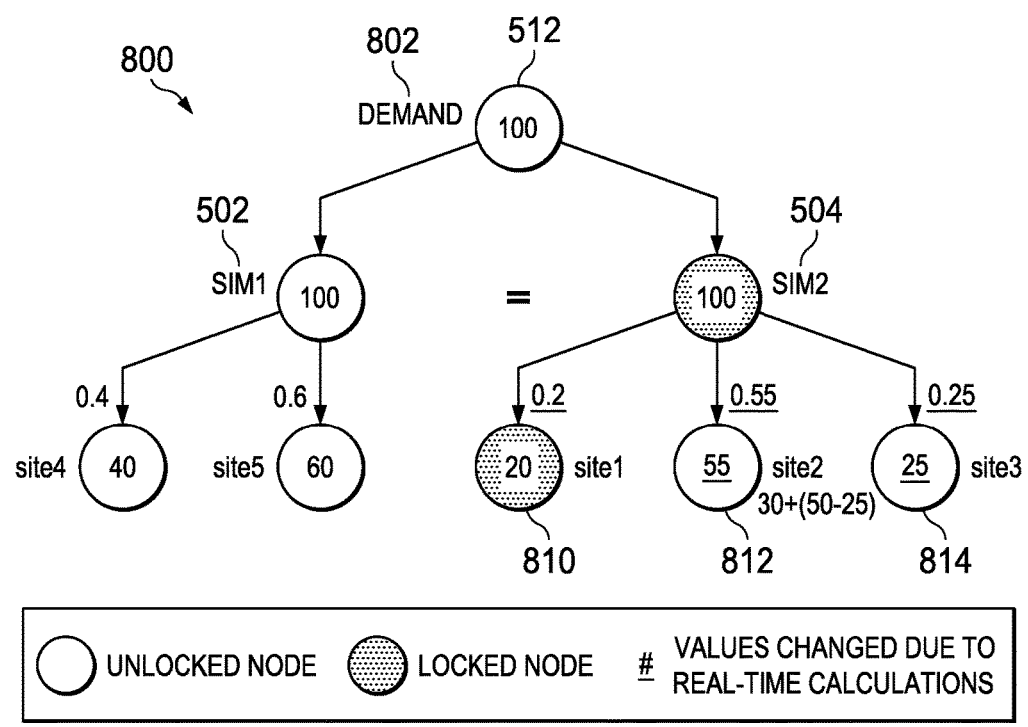

FIG. 6 illustrates an exemplary leaf level network 600 for reallocating demand based on a changed load with two subcomponents, according to an embodiment. FIG. 6 represents an initial state for the leaf level network. FIGS. 7 and 8 illustrate reallocation of demand based on a change in load with an unlocked and locked parent node, respectively. Turning back to FIG. 6, demand 602 requires production of one hundred finished items at finished product node 512. Two simultaneous parent nodes, SIM1 502 and SIM2 504, represent two subcomponents which, in this embodiment, are required to make the finished product represented by finished product node 512. The equal sign 604 denotes that equal amounts of subcomponents are needed from both simultaneous parent nodes SIM1 502 and SIM2 504 to make the finished product 512, comprising a dependent demand of 100 of the SIM1 subcomponent and a dependent demand of 100 of the SIM2 subcomponent. Subcomponents refer to items or parts needed to manufacture a finished product 512. SIM1 502 and SIM2 504 may also represent manufacturers, distributions centers, buyers, suppliers, facilities, components, resources, raw materials, components and assembly lines, or the load or demand of them.

In this embodiment, alternate dependent nodes 606, 608, 610, 612 and 614 represent manufacturing sites 1-5 that supply simultaneous parent nodes SIM1 502 and SIM2 504 with subcomponents for finished product 512. Two alternate dependent nodes, site 4 606 and site 5 608, provide subcomponents to simultaneous parent node SIM1 502. In an embodiment, the predefined supply splits are 0.4 for alternate dependent node site 4 606, and 0.6 for alternate dependent node site 5 608. Therefore, there is a dependent demand of 40 from alternate dependent node site 4 606 and 60 from alternate dependent node site 5 608. Three possible alternate dependent nodes, site 1 610, site 2 612, and site 3 614, provide subcomponents to simultaneous parent node SIM2 504. In this example, the predefined supply splits are 0.2 for alternate dependent node site 1 610, 0.3 for site 2 612, and 0.5 for site 3 614. Dependent demand for alternate dependent site 1 610 is 20, site 2 612 is 30, and site 3 614 is 50. An assumption is made in this example of no leadtime, no unit yield, and no conversion factors. Load in this example is the same as the dependent demand. Although, a particular configuration of nodes, subcomponents, a particular number of sites and a particular predefined supply split and dependent demand are shown and described, embodiments contemplate any type of nodes, configuration of nodes, any number of subcomponents and/or sites or any number of supply splits and/or dependent demands according to particular needs. In some embodiments, a subcomponent from various alternate dependent nodes may represent different configurations or varieties of a particular subcomponent. For example, alternate dependent node site 1 610 may comprise a high-speed CPU, site 2 612 may comprise a medium-speed CPU, and site 3 614 may comprise a low-speed CPU.

FIG. 7 illustrates an exemplary leaf level network 700 with load and demand reallocated based on a change in load at alternate dependent node site 3 714 with an unlocked simultaneous parent node SIM2 514. In an embodiment, simultaneous parent node SIM2 514 may be unlocked because alternate dependent nodes site 1 710 and site 2 712 may be unable to produce a higher load than currently represented, 20 and 30, respectively. In this particular embodiment FIG. 7, load at alternate dependent node site 3 714 has been reduced to 25 from 50, as in alternate dependent site 3 614 in FIG. 6. Based on the change in load at site 3 714, Real-time multi-facet interactive planner 110 reduces the demand 702 at finished product node 512 and dependent demand at simultaneous parent nodes SIM1 502 and SIM2 504. Load changes are noted by real-time multi-facet interactive planner 110, followed by updated dependent demand changes at a particular node. Demand is thus reduced from 100 to 75 because site node 1 710 and site node 2 712 are limited in load of subcomponents.

In some embodiments, real-time multi-facet interactive planner 110 "locks" load-constrained nodes at a certain load amount. Real-time multi-face interactive planning system does not modify load at a locked node in response to a modified load at another node, which ultimately limits demand at finished product node 512. Based on a load change, real-time multi-facet interactive planner 110 modifies load in node SIM2 504 from 100 in FIG. 6 to 75 in FIG. 7. Because the subcomponent supply from node SIM1 502 and node SIM2 504 must be equal, real-time multi-facet interactive planner 110 automatically modifies node SIM1 502 to 75.

Subcomponent supply split percentages are modified based on load changes, while real-time multi-facet interactive planner 110 takes into account load-constrained locked nodes. For example, site 1 710 is locked at a load of 20 and site 2 712 is locked at a load of 30. When real-time multi-facet interactive planner 110 modifies load at site 3 714, the supply split percentage are modified to 0.267 at site 1 710, 0.4 at site 2 712, and 0.333 at site 3 714. When load is modified at SIM 1 502 to 75, the 0.4 percentage supply split from unlocked site 4 706 results in a modified load of 30 from site 4 706. The 0.6 percentage supply split from unlocked site 5 708 results in a modified load of 45. Modified loads of 30 and 45 result in the required load of 75 at SIM 1 502.

The examples provided above in FIG. 7 and below in FIG. 8 are merely examples of how multi-facet real-time interactive planning system 110 may work in particular simplified examples. They are not intended to be limiting of multi-facet real-time interactive planning system 110 or method 540. Furthermore, discussions of dependent demand, demand, load, and revenue propagation have been withheld for clarity.

FIG. 8 illustrates an exemplary leaf level network 700 with load and demand reallocated based on a change in load at alternate dependent node site 3 714 with a locked simultaneous parent node SIM2 514. Similar to the example described in FIG. 7, load at alternate dependent node site 3 814 is reduced from 50 as in FIG. 6 to 25 in the example of FIG. 8. Because load is locked at simultaneous parent node SIM2 504 and is unlocked for at least one of alternate dependent nodes site 1 810 and site 2 812, real-time multi-facet interactive planner 110 transfers load from alternate dependent site 3 814 to unlocked site 2 812 with demand 802 at finished product node 512 remaining constant at 100. Because reduced load at site 3 814 is transferred to site 2 812, demand 802 is not affected.

In some embodiments, simultaneous parent node SIM 2 504 is load-constrained and locked at 100. When load is modified at site 3 814 from 50 to 25, a load transfer of 25 is added to the existing load (i.e., 30) at unlocked site 2 812. The modified load of site 2 is 55 (i.e., 25+30). Load at site 1 810 is not modified from 20 because it is locked. The subcomponent supply percentage split is modified to reflect the transferred load to site 2 812. The percentage split from site 1 remains at 0.2, changes to 0.55 at site 2 812, and changes to 0.25 at site 3 814.

In the previous exemplary scenario, the load transfer described could represent a real situation where real-time multi-facet interactive planner 110 sources 50% of subcomponents from a first country (i.e., site 3 814). Because of a load change, real-time multi-facet interactive planner 110 modifies load to source 25% of subcomponents from the first country and increases load to 55% of subcomponents from a second country (site 2 812).

In embodiments, real-time multi-facet interactive planner 110 enables load transfer by moving load from one site to another without affecting demand, as shown in FIG. 8. Real-time multi-facet interactive planner 110 enables load increase or reduction and thereafter increases or reduces demand, as shown in FIG. 7. Real-time multi-facet interactive planner 110 performs interactive calculations at the edited level and then updates the previous load and demand data at the lowest level of granularity. Real-time multi-facet interactive planner 110 re-performs these calculations at the lowest level to maintain consistency from a higher level and the lower level. In one embodiment, as in FIG. 7, as the demand is reduced from 100 to 75, real-time multi-facet interactive planner 110 reduces the revenue as well. For example, if one or more entities 120 is selling the finished product for $2, one or more entities 120 receives $150 in revenue (75*$2=$150), instead of $200 (100*$2=$200). In one embodiment, revenue is static, based on demand at a particular price.

Figure 9:
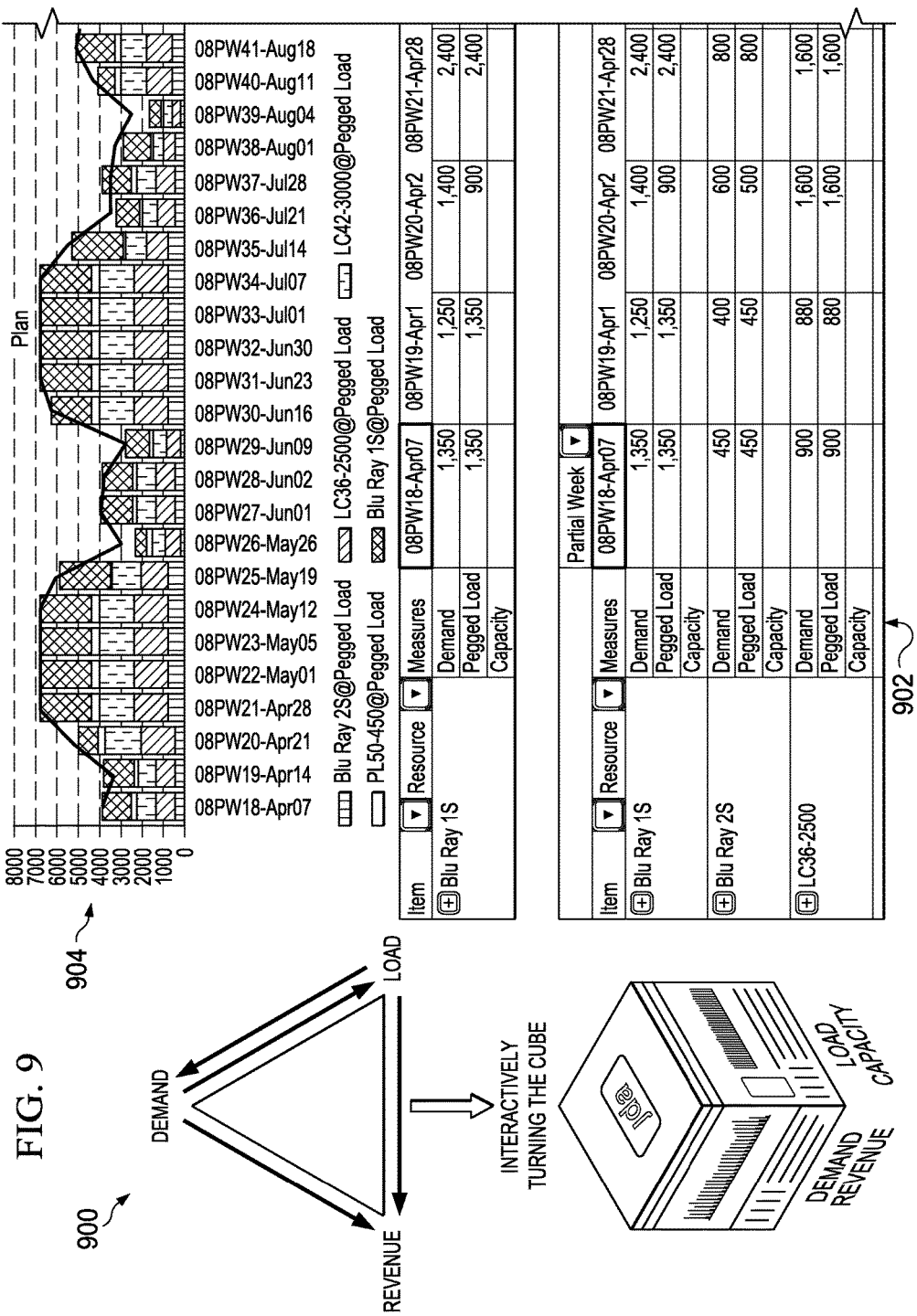
FIGS. 9-10 illustrate an exemplary user interface in association of real-time multi-face planning system, according to an embodiment.

FIG. 9 illustrates a user interface 900 in association with exemplary system 100, according to an embodiment. User interface 900 facilitates edits and modifications to the various facet parameters 902 in real-time multi-facet interactive planner 110 described herein, including load, pegged load, capacity, demand, and revenue. User interface 900 elements provide a visual representation of load scenarios and illustrate the effects of facet modifications. User interface 900 shows combined product and resource centric views. User interface 900 includes any number of screens and pages to represent any number and form of user interface elements to facilitate the disclosed edits and display the disclosed facet data. User interface comprises any number of reports, charts, graphs, and the like.

In one embodiment, user interface displays graph 904. Graph 904 includes a capacity line showing current capacity for a resource and a visualization of the break-up of the load, such as the amount of the load for each product category. In scenarios where an organization produces many different items or product families from the same resource, for example, the user interface color codes the items in accordance with their respective categories. The pivot 900 and 902 shows the demand anchored view where different product family demand and their breakups are shown.

Figure 10:
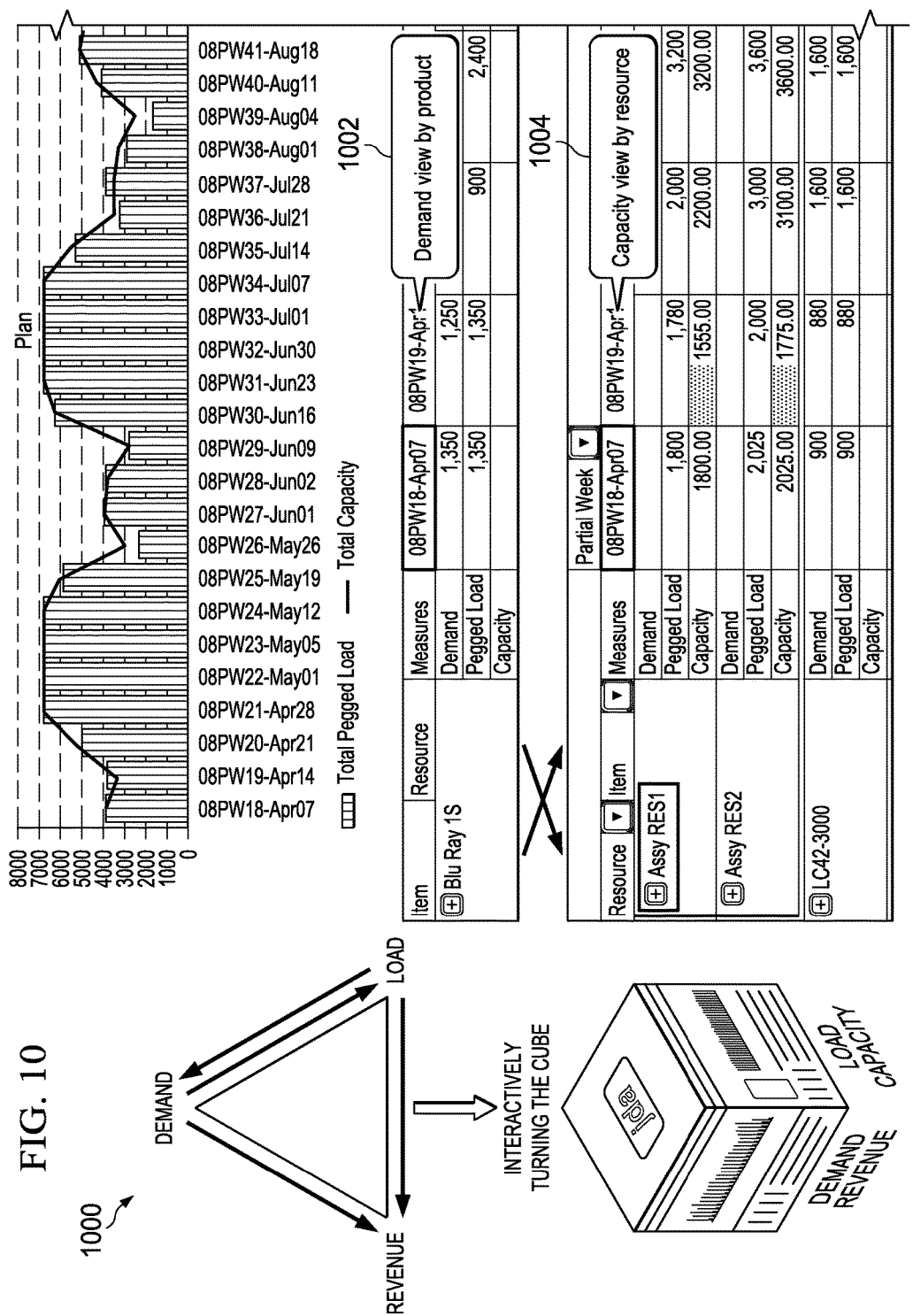

FIG. 10 illustrates a user interface 1000 in association with exemplary system 100, according to an embodiment. In an embodiment, elements of user interface 1000 provide a visual representation of load scenarios and illustrate the effects of facet modifications. The user interface shows combined product and resource anchored views. In a demand view by product 1002, an item is shown in relation to the resources that are needed to build the item in 1004. Real-time multi-facet interactive planner 110 modifies the demand and revenue facets when load facet is edited or load and revenue facets when demand facet is edited.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for a user interface providing a single unified visualization of the real-time impact on demand in response to editing load in a sales and operations plan, comprising:

displaying, within a graphical user interface on a computer screen, a facet interrelation data cube having at least two faces and displaying interactive rotation data comprising first facet data, second facet data, and third facet data, wherein a first face of the at least two faces comprises first facet data anchored by a first anchor and comprising a first facet value, and a second face of the at least two faces comprises second facet data and third facet data, the second facet data is anchored by a second anchor and comprises a second facet value, and third facet data is anchored by the second anchor and comprises a third facet value;

constantly monitoring for user input and a change, the change comprising a new value of the first facet value, the second facet value or the third facet value;

in response to detecting the change comprising the new value of the first facet value, the second facet value or the third facet value from the user input, automatically rotating one or more rows of the facet interrelation data cube, by a processor, and displaying, within the graphical user interface on the computer screen, a single unified view comprising data anchored by the first anchor and data anchored by the second anchor in a same column of the facet interrelation data cube; and when the change comprises a new value of the second facet value or the third facet value, automatically changing the first facet value in real time, by the processor, based at least in part, on the new value for the second facet value or the third facet value and updating the graphical user interface to display the changed first facet value on the computer screen.

2. The computer-implemented method of claim 1, wherein the first facet data is demand data, the first facet value is a demand value, the second facet data is load data, the second facet value is a load value the third facet data is revenue data, and the third facet value is a revenue value.

3. The computer-implemented method of claim 2, wherein the first anchor is a product anchor and the second anchor is a resource anchor.

4. The computer-implemented method of claim 3, further comprising:
modeling the demand value as a parent node on a leaf level network;
modeling at least two dependent demand values as dependent nodes on the leaf level network;
storing a percentage split between the at least two dependent demand values; and
determining at least one of the dependent demand values based on the percentage split.

5. The computer-implemented method of claim 4, further comprising:
automatically updating at least one of the dependent demand values when the load value is edited.

6. The computer-implemented method of claim 5, further comprising:
automatically unlocking the parent node when at least one of the dependent nodes representing a load change has no alternate nodes where load may be transferred.

7. The computer-implemented method of claim 1, wherein the first facet data is load data, the first facet value is a load value, the second facet data is demand data, and the second facet value is a demand value.

8. A system for a user interface providing a single unified visualization of the real-time impact on demand in response to editing load in a sales and operations plan, comprising:
a display comprising a facet interrelation data cube having at least two faces and displaying within a graphical user interface on a computer screen interactive rotation data comprising first facet data, second facet data, and third facet data, wherein a first face of the at least two faces comprises first facet data anchored by a first anchor and comprising a first facet value and a second face of the at least two faces comprises second facet data and third facet data, the second facet data is anchored by a second anchor and comprises a second facet value, and third facet data is anchored by the second anchor and comprises a third facet value; and a computer configured to:
- monitor for user input and a change, the change comprising a new value of the first facet value, the second facet value, or the third facet value;
- in response to detecting the change comprising the new value of the first facet value, the second facet value or the third facet value from user input, rotate one or more rows of the facet interrelation data cube and display, within the graphical user interface on the computer screen, a single unified view comprising data anchored by the first anchor and data anchored by the second anchor in a same column of the facet interrelation data cube; and
- when the change comprises receiving a new value for the second facet value or the third facet value, automatically change the first facet value, based at least in part, on the new value for the second facet value or the third facet value and update the graphical user interface to display the changed first facet value on the computer screen.

9. The system of claim 8, wherein the first facet data is demand data, the first facet value is a demand value, the second facet data is load data, the second facet value is a load value the third facet data is revenue data, and the third facet value is a revenue value.

10. The system of claim 9, wherein the first anchor is a product anchor and the second anchor is a resource anchor.

11. The system of claim 10, wherein the computer is further configured to:
- model the demand value as a parent node on a leaf level network;
- model at least two dependent demand values as dependent nodes on the leaf level network;
- store a percentage split between the at least two dependent demand values; and
- determine at least one of the dependent demand values based on the percentage split.

12. The system of claim 11, wherein at least one of the dependent demand values is automatically updated when the load value is edited.

13. The system of claim 12, wherein the parent node is automatically unlocked when at least one of the dependent nodes representing a load change has no alternate nodes where load may be transferred.

14. The system of claim 8, wherein the first facet data is load data, the first facet value is a load value, the second facet data is demand data, and the second facet value is a demand value.

15. A non-transitory computer-readable medium embodied with software, the software, when executed, configured to:
- display, within a graphical user interface on a computer screen, a facet interrelation data cube having at least two faces and displaying interactive rotation data comprising first facet data, second facet data, and third facet data, wherein a first face of the at least two faces comprises first facet data anchored by a first anchor and comprising a first facet value, and a second face of the at least two faces comprises second facet data and third facet data, the second facet data is anchored by a second anchor and comprises a second facet value, and third facet data is anchored by the second anchor and comprises a third facet value;
- constantly monitor for user input and a change, the change comprising a new value of the first facet value, the second facet value or the third facet value;
- in response to the change comprising the new value of the first facet value, the second facet value or the third facet value from the user input, automatically rotate one or more rows of the facet interrelation data cube and display, within the graphical user interface on the computer screen, a single unified view comprising data anchored by the first anchor and data anchored by the second anchor in a same column of the facet interrelation data cube; and
- when the change comprises a new value of the second facet value or the third facet value, automatically change the first facet value in real time, based at least in part, on the new value for the second facet value or the third facet value and update the graphical user interface to display the changed first facet value on the computer screen.

16. The non-transitory computer-readable medium of claim 15, wherein the first facet data is demand data, the first facet value is a demand value, the second facet data is load data, the second facet value is a load value the third facet data is revenue data, and the third facet value is a revenue value.

17. The non-transitory computer-readable medium of claim 16, wherein the first anchor is a product anchor, the second anchor is a resource anchor and the third facet value is a revenue value.

18. The non-transitory computer-readable medium of claim 17, wherein the software is further configured to:
- model the demand value as a parent node on a leaf level network;
- model at least two dependent demand values as dependent nodes on the leaf level network;
- store a percentage split between the at least two dependent demand values; and
- determine at least one of the dependent demand values based on the percentage split.

19. The non-transitory computer-readable medium of claim 18, wherein the software is further configured to:
- automatically update at least one of the dependent demand values when the load value is edited.

20. The non-transitory computer-readable medium of claim 19, wherein the software is further configured to:
- automatically unlock the parent node when at least one of the dependent nodes representing a load change has no alternate nodes where load may be transferred.

* * * * *